Figure 1:
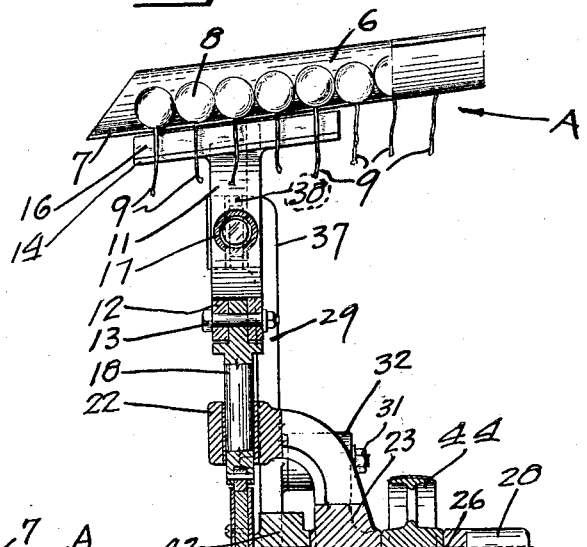

Sept. 6, 1932.   G. D. GARDNER   1,876,051

STEM REMOVER

Filed Sept. 21, 1929

INVENTOR.
GEORGE D. GARDNER
BY
ATTORNEYS.

Patented Sept. 6, 1932

1,876,051

UNITED STATES PATENT OFFICE

GEORGE D. GARDNER, OF SAN JOSE, CALIFORNIA, ASSIGNOR, BY MESNE ASSIGNMENTS, TO BARRON GRAY PACKING COMPANY, OF SAN JOSE, CALIFORNIA, A CORPORATION OF CALIFORNIA

STEM REMOVER

Application filed September 21, 1929. Serial No. 394,248.

The invention relates to stem removers.

In the preparation of fruits and particularly cherries, for canning or the like, it is necessary to remove the stems of the fruit. Heretofore the stems were cut or pulled out of the fruit in such a manner, as to break the stem, leaving a part of the stem in the fruit. To pull the stems out of fruit, by hand, would be very inefficient and costly, when fruits are prepared on a large scale.

The primary object of this invention is the provision of a mechanical stem remover, which positively grips the stems of the fruit, and exerts thereon a pulling force in such a manner as to positively remove the entire stem from the fruit; the fruit being held by suitable means against any tendency to follow the stem movement.

Another object of the invention is to provide a stem remover for cooperation with a fruit holding member; the fruit being advanced in said member so that the stems of the fruit project in the same direction; the stem remover being adapted to grip a plurality of the stems in one operation and to pull the same out of the fruit without breaking the same or leaving any portion thereof in the fruit.

Another object of the invention is to provide a stem remover cooperating with a fruit holding chute in which latter the fruit is advanced so that the stems of the fruit project out of the chute in the same direction; the stem remover having gripping means thereon mechanically advanced toward and away from the said chute, and being actuated at a point nearest to the chute to close upon the stems projecting therefrom, and to firmly pull the same out of the fruit, when advanced away from the chute, thereby to positively remove the stems from the fruit.

Particularly it is the object of the invention to provide a stem remover, which is open when it approaches a fruit holder, in which the fruit is so arranged that the stems thereof project beyond the holder in the same direction, the said remover being adapted to close and to grip the projecting stems and then to be moved away from the holder in its gripping position, thereby pulling out the stems from the fruit.

Other objects and advantages are to provide a stem remover that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein

Figure 2:
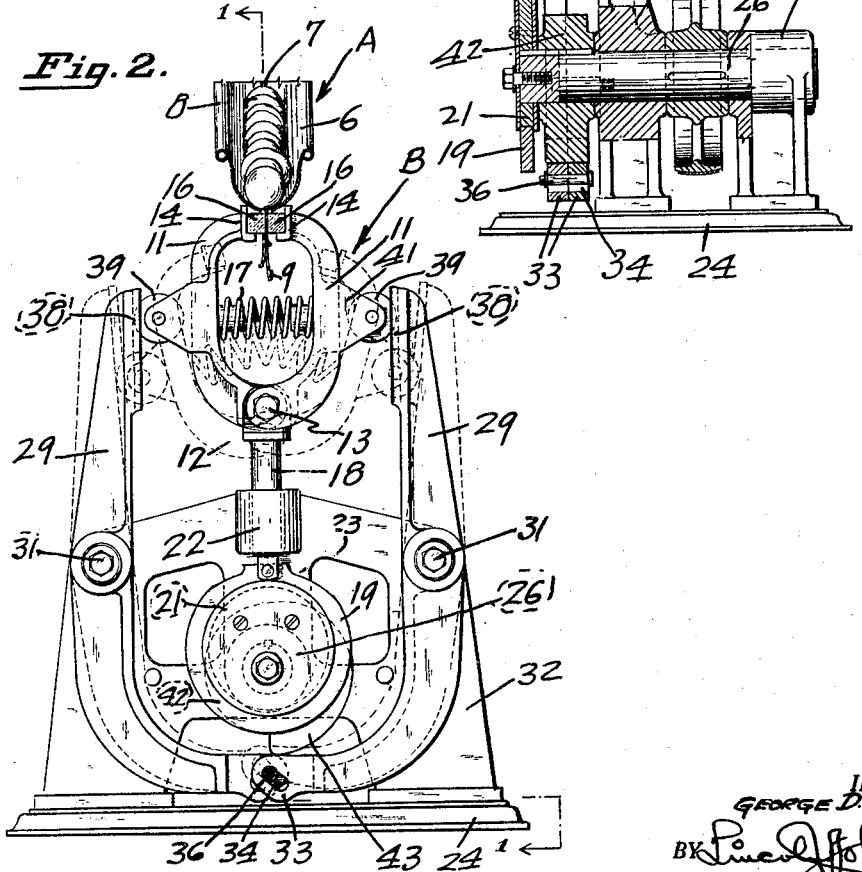

Fig. 1 is a sectional view of the fruit retainer, and the stem remover, on the line 1—1 of Fig. 2; and Fig. 2 is an end view of the stem remover.

In its general organization my invention comprises a fruit holder A, a stem gripping mechanism B, and means to advance said gripping mechanism in an open position toward the holder, then closing the same upon the stems of the fruit, and then moving the mechanism B away from the holder A, in its gripping position, so as to pull the stems out of the fruit held in the holder A.

In carrying out my invention I make use of a chute 6 of substantially semi-circular cross section, which is disposed in an inclined position. A longitudinal slot 7 extends throughout the length of the chute 6, whereby the latter is split in two halves. In the chute 6 is placed the fruit to be treated, in the present application cherries 8. By vibrating the chute 6 in any conventional manner, not shown, the cherries are shaken and advanced therein toward the lower end thereof. While the cherries are shaken, they turn about, until the stems 9 thereof fall into the slot 7, whereby any further lateral turning of the cherries is prevented, and the same are advanced by vibration and gravity in said chute 6, with their stems 9 depending from the chute 6 thru said slot 7.

The stems 9 are pulled out of the cherries 8, by the movement of the gripping mechanism A, toward and away from the fixed chute 6. The gripping is accomplished by gripping arms 11, each being curved in U-shape. The arms 11 are pivoted at the lower, inner ends 12 thereof, on a pivot bolt 13 common to both arms. The end 12 of one arm is reduced in cross section, the end 12 of the other arm 11 is bifurcated so as to straddle the narrower end. In the free end 14 of each arm 11 is mounted a gripper lining strip 16, so that the lining strips 14 of the opposite arms 11 face each other. The lining strips 16 are made preferably of rubber or a like elastic material. A spring 17 between the inner faces of the arms 11 urges the same apart around the pivoted ends 12 thereof, so as to tend to cause the moving of the lining strips 16 apart into open position. It is to be noted that the free end 14 of each arm 11 is elongated into an inclined jaw, substantially parallel with the incline of the chute 6.

In order to move the gripping mechanism B toward and away from the chute 6, the pivot bolt 13 is mounted on the end of a shaft 18, which in turn is attached at the other end thereof to an eccentric band 19 of an eccentric 21. The shaft 18 and the gripping mechanism A thereon are reciprocated by the rotation of the eccentric 21 and by the corresponding lineal movement of the eccentric band 19. In its reciprocation the shaft 18 is guided in a preferably vertical bearing 22 extending from a bracket 23. The bracket 23 is mounted on a suitable base 24. The eccentric 21 is rotated by the rotation of a shaft 26, journaled in a bearing 27 of the bracket 23 and in a bearing bracket 28 on the base 24.

By rotating the shaft 26, the eccentric 21 is rotated and the entire gripping mechanism B is reciprocated toward and away from the chute 6.

In order to pull out the stems 9 from the cherries 8, it is necessary to close the gripping jaws and linings 16 against each other at a time when the gripping mechanism B is in its highermost position, nearest to the chute 6. Then the mechanism B must be moved away from the chute 6, pulling the gripped stems 9 out of the cherries 8, the latter being held in the chute 6. At a certain point of its travel away from the chute 6, the gripping mechanism B must be opened to release the removed stems 9, and then the open mechanism B is to be moved back toward the chute 7.

The opening and closing of the gripping mechanism B, at the proper points of its travel is accomplished by the movement of levers 29. Each lever 29 is pivoted at 31, intermediate its ends, on lateral extensions 32 of the bracket 23. There is one lever 29 on each side of the mechanism B. The ends 33 of the levers 29 nearer to the base 24, are reduced in thickness, and overlap each other. Each end 33 has an elongated slot 34 therein. A pivot pin 36 extends thru said slot 34 pivotally attaching the lever ends 33 to each other with freedom of limited play, to compensate for the arcuate movement of said ends around the fulcrum 31 of the levers 29.

The free ends 37 of the levers 29 are enlarged to form a longitudinal track 38 thereon. Upon the tracks 38 ride rollers 39, each roller being journaled in an ear 41 extending outwardly from the arms 11, one roller opposite each end of the spring 17. Thus, the rollers 39 are pressed against the tracks 38 by the outward urging action of the spring 17 upon the arms 11.

If the levers 29 were free to turn around their respective fulcrums 31, then the action of the spring 17 would hold the arms 11 apart at all times. In order to hold the levers 29 in gripping position, I provide a cam 42, keyed on the shaft 26, between the eccentric 21 and the bracket 23. The eccentric portion 43 of the cam 42 is so arranged as to press the lever ends 33 toward the base 24 at times, and to allow the movement of said ends 33 away from the base, at other times. When the ends 32 are held in the position thereof nearest the base 24, then the free ends 37 of the levers 29 are held closest to each other, thereby pressing the arms 11 toward each other, whereby the gripping strips 16 firmly grip the stem 9. The cam 42 is so disposed that it forces the lever ends 33 toward the base at a time when the mechanism B is nearest to the chute 6. The further rotation of the shaft 26 will rotate the eccentric 21 so as to move the gripping mechanism B away from the chute 6. The cam 42 rotates with the eccentric 21, and the eccentric portion 43 thereof holds the levers in gripping position to a certain part of the downward movement of the mechanism B. After the eccentric portion 42 is rotated past the lever ends 33, the levers 29 are allowed to be moved outwardly, due to the pressure of the spring 17 on the arms 11. The eccentric portion 43 then travels around with the rotation of the shaft 26, and it does not reach the lever ends 33 until the eccentric 21 and the shaft 18 again bring the gripping mechanism into its position nearest to the chute 6. In this position the eccentric portion 43 again bears against the lever end 33 thereby causing the griping mechanism B to firmly grip the stems 9 of another bunch of cherries 8 descending in the vibrating chute 6. This operation is repeated once in every revolution of the shaft 26.

Rotation may be transmitted to the shaft 26 in any conventional manner, such as thru a pulley 44 driven by a suitable prime mover.

It will be recognized that a particularly simple mechanism is provided to remove the stems from fruit by causing a firm gripping element to approach a group of stems in open position, then to firmly grip the stem, and pull the same out of the fruit. The device is simple in construction and positive in operation; it does not require any careful setting or adjustment, therefore it readily lends itself to effective application by the labor ordinarily available.

Having thus described this invention, what I claim and desire to secure by Letters Patent is:

1. The combination with means to hold fruit with the stems thereof projecting in the same direction therefrom, of a stem remover comprising a frame disposed in operative relation to said holding means; opposed gripping elements, means on said frame to support and reciprocate said elements, the latter being pivotally mounted on the reciprocating means to permit the movement of said elements toward and away from each other; means to normally urge the said elements away from each other; means on the frame to force said elements against each other, said last mentioned means being operated in synchronism with the said reciprocating means to close said elements into gripping position at an end of their stroke, and to maintain the elements in gripping position during a part of their return stroke, said element closing means comprising an actuating lever pivoted intermediate its ends on the frame, adjacent each element; an end of each lever being adapted to engage one of the elements to force the same toward the other element; and an actuating member related to said reciprocating means and acting upon the other end of each lever to urge the first mentioned end thereof against the respective element at the end of a stroke of said elements and during a part of their return stroke.

2. The combination with an inclined holder for advancing fruit therein so that the stems of the fruit project from said holder in the same direction, of a stem remover comprising a frame operatively related to said holder; gripping elements; reciprocating means on the frame to which each element is pivoted to move said elements toward and away from said holder; gripping jaws on the free ends of said elements adapted to grip a plurality of said stems; a lever adjacent each element being pivoted intermediate its ends on said frame; means operated in synchronism with said reciprocating means to act upon the said levers so as to urge an end of each lever against the respective element, so as to close the elements in gripping position at the end of their stroke toward the holder, and to maintain said elements in closed position at the first part of their return stroke; and resilient means to urge said elements into a non-gripping position, when the said elements are released by said levers.

3. The combination with means to hold and advance fruit with its stems extending in the same direction, of a stem remover comprising a pair of pivotally connected stem gripping members, a pair of levers pivoted for engagement, one with each of said stem gripping members, means for reciprocating the gripping members toward and away from the stems and means for oscillating said levers to engage and urge the gripping members to a closed position as they approach the stems.

In testimony whereof, I have hereunto set my hand at San Francisco, California, this 24th day of August, 1929.

GEORGE D. GARDNER.